852# United States Patent
Xie et al.

(10) Patent No.: US 10,182,089 B2
(45) Date of Patent: Jan. 15, 2019

(54) METHOD AND BROADCAST MULTICAST SERVICE CENTER, BM-SC, NODE FOR PROVIDING AN ON-REQUEST SERVICE

(71) Applicant: Telefonaktiebolaget LM Ericsson (publ), Stockholm (SE)

(72) Inventors: Jinyang Xie, Shanghai (CN); Jie Ling, Shanghai (CN); Nancy Ye, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 280 days.

(21) Appl. No.: 15/300,066

(22) PCT Filed: Mar. 31, 2014

(86) PCT No.: PCT/CN2014/074426
§ 371 (c)(1),
(2) Date: Sep. 28, 2016

(87) PCT Pub. No.: WO2015/149231
PCT Pub. Date: Oct. 8, 2015

(65) Prior Publication Data
US 2017/0163700 A1 Jun. 8, 2017

(51) Int. Cl.
*H04L 29/06* (2006.01)
*H04N 21/6405* (2011.01)
(Continued)

(52) U.S. Cl.
CPC ........ *H04L 65/4076* (2013.01); *H04L 1/0042* (2013.01); *H04L 1/0057* (2013.01);
(Continued)

(58) Field of Classification Search
CPC .. H04L 65/4076; H04L 1/0042; H04L 1/0057
See application file for complete search history.

(56) References Cited

U.S. PATENT DOCUMENTS 6,609,223 B1  8/2003  Wolfgang

FOREIGN PATENT DOCUMENTS

| CN | 101605242 A | 12/2009 |
| CN | 202068514 U | 12/2011 |

(Continued)

OTHER PUBLICATIONS

3GPP, "3rd Generation Partnership Project; Technical Specification Group Services and System Aspects; Multimedia Broadcast/Multicast Service (MBMS); Protocols and codecs (Release 12)", 3GPP TS 26.346 V12.1.0, Mar. 2014, 1-181.

(Continued)

*Primary Examiner* — Siming Liu
(74) *Attorney, Agent, or Firm* — Murphy, Bilak & Homiller, PLLC

(57) ABSTRACT

The present disclosure relates to a method 100 performed in a broadcast multicast service center, BM-SC, node 10 for providing an on-request service to an end-user device 5. The method 100 comprises obtaining 101, from a content delivery node 4, the size of a file of the on-request service; determining (102), based on the obtained file size, one or more parameters related to encoding of the file, thereby establishing a virtual partitioning of the file into a number Z of source blocks; downloading 103, from the content delivery node 4, a source block of the file according to the determined one or more parameters; encoding 104 the source block of the file into encoding symbols according to the determined one or more parameters; and providing 105 the encoding symbols for delivery to the end-user device 5. The disclosure also relates to a BM-SC node 10, computer programs and computer program products.

20 Claims, 7 Drawing Sheets

(51) Int. Cl.
    *H04N 21/845* (2011.01)
    *H04L 1/00* (2006.01)
    *H04L 12/24* (2006.01)
    *H04L 29/08* (2006.01)
    *H04W 4/06* (2009.01)

(52) U.S. Cl.
    CPC ...... *H04L 41/5051* (2013.01); *H04L 65/4084* (2013.01); *H04L 65/605* (2013.01); *H04L 65/607* (2013.01); *H04L 65/80* (2013.01); *H04L 67/02* (2013.01); *H04L 67/06* (2013.01); *H04N 21/6405* (2013.01); *H04N 21/8456* (2013.01); *H04W 4/06* (2013.01)

(56) References Cited

FOREIGN PATENT DOCUMENTS

| | | | |
|---|---|---|---|
| WO | 2014004955 A1 | 1/2014 | |
| WO | WO-2014004955 A1 * | 1/2014 | ......... G06Q 30/0251 |

OTHER PUBLICATIONS

Paila, T. et al., "Flute—File Delivery over Unidirectional Transport", Internet Engineering Task Force (IETF), Request for Comments 6726, Nov. 2012, 1-46.

Unknown, Author, "Miscellaneous proposals for TR 26.946", Digital Fountain et al., 3GPP TSG-SA WG4#38, S4-060028, Rennes, France, Feb. 13-17, 2006, 1-8.

* cited by examiner

US 10,182,089 B2

METHOD AND BROADCAST MULTICAST SERVICE CENTER, BM-SC, NODE FOR PROVIDING AN ON-REQUEST SERVICE

TECHNICAL FIELD

The technology disclosed herein relates generally to the field of multimedia broadcast multicast services, and in particular to the providing of on-request services.

BACKGROUND

Evolved Multimedia Broadcast Multicast Service (eMBMS) is a point-to-multipoint interface specification for existing and future 3GPP cellular networks. The eMBMS provides an efficient broadcast delivery to a potentially large number of users; the efficiency consisting e.g. in efficient resource use. The eMBMS may also provide unicast services, such as on-request content (also known as on-demand content). The eMBMS is thus used for broadcasting live streaming and also on-request content to multiple users, particularly in highly dense areas in order for efficient usage of radio frequency resources.

There is a general desire to reduce delays in communication, and users of today expect to receive requested content as soon as they request it, i.e. with as low delay as possible. There are several sources of delay on the way from a provider of data services, e.g. multi-media services such as pictures, sound, video etc., down to the end user. There are for instance queuing delays at gateways, processing delays in intermediate nodes, delays relating to congestion in the communication network and delays relating to capacity of wireless links.

U.S. Pat. No. 6,609,223 B1 relates to live streaming applications and addresses a difficulty of minimizing delays occurring in such applications, wherein data of a data stream should be processed and transmitted at it arrives. In particular, from a delay point of view it is, in such applications, difficult to implement retransmission of missed data.

The operator of a cellular communication network is providing an increasing number of services, the MBMS being one example. The operator therefore needs to invest in an increasing number of various related hardware and software to support all these services, which entails increasing costs for the operator.

SUMMARY

An object of the present teachings is to solve or at least alleviate at least one of the above mentioned problems.

The object is according to a first aspect achieved by a method performed in a broadcast multicast service center, BM-SC, node for providing an on-request service to an end-user device. The method comprises obtaining, from a content delivery node, the size of a file of the on-request service; determining, based on the obtained file size, one or more parameters related to encoding of the file, thereby establishing a virtual partitioning of the file into a number Z of source blocks; downloading, from the content delivery node, a source block of the file according to the determined one or more parameters; encoding the source block of the file into encoding symbols according to the determined one or more parameters; and providing the encoding symbols for delivery to the end-user device.

An advantage of the method is that it allows for smaller local storage, or removal thereof, in the BM-SC node, since the BM-SC node can deliver the requested data during file caching. The method thereby reduces hardware costs for the operator of the communication network. Further, the method provides an advantage of reducing the delay from request to delivery from the content provider to the end-user e.g. in that the method enables a progressive broadcast delivery for on-request services. A still further advantage is that the method enables control of the memory usage in the BM-SC node, whereby the memory use and size can be minimized. This again reduces hardware costs related costs for the operator. Yet another advantage is that the operator of the communication network is enabled less involvement in the delivery of on-request services in that the BM-SC node is alleviated from the need to wait for notification events to trigger a content delivery.

The object is according to a second aspect achieved by a broadcast multicast service center, BM-SC, node for providing an on-demand service to an end-user device. The BM-SC node comprises a processor and memory, the memory containing instructions executable by the processor, whereby the BM-SC node is operative to: obtain, from a content delivery node, the size of a file of the on-request service; determine, based on the obtained file size, one or more parameters related to encoding of the file, thereby establishing a virtual partitioning of the file into a number Z of source blocks; download, from the content delivery node, a source block of the file according to the determined one or more parameters; encode the source block of the file into encoding symbols according to the determined one or more parameters; and provide the encoding symbols for delivery to the end-user device.

The object is according to a third aspect achieved by a computer program for a broadcast multicast service center, BM-SC, node for providing an on-demand service to an end-user device. The computer program comprises computer program code, which, when run on the BM-SC node causes the BM-SC node to: obtain, from a content delivery node, the size of a file of the on-request service; determine, based on the obtained file size, one or more parameters related to encoding of the file, thereby establishing a virtual partitioning of the file into a number Z of source blocks; download, from the content delivery node, a source block of the file according to the determined one or more parameters; encode the source block of the file into encoding symbols according to the determined one or more parameters; and provide the encoding symbols for delivery to the end-user device.

The object is according to a fourth aspect achieved by a computer program product comprising a computer program as above, and a computer readable means on which the computer program is stored.

The object is according to a fifth aspect achieved by a broadcast multicast service center, BM-SC node for providing an on-demand service to an end-user device. The BM-SC node comprises: means for obtaining, from a content delivery node, the size of a file of the on-request service; means for determining, based on the obtained file size, one or more parameters related to encoding of the file, thereby establishing a virtual partitioning of the file into a number Z of source blocks; means for downloading, from the content delivery node, a source block of the file according to the determined one or more parameters; means for encoding the source block of the file into encoding symbols according to the determined one or more parameters; and means for providing the encoding symbols for delivery to the end-user device.

Further features and advantages of the present teachings will become clear upon reading the following description and the accompanying drawings.

DETAILED DESCRIPTION

Figure 1:
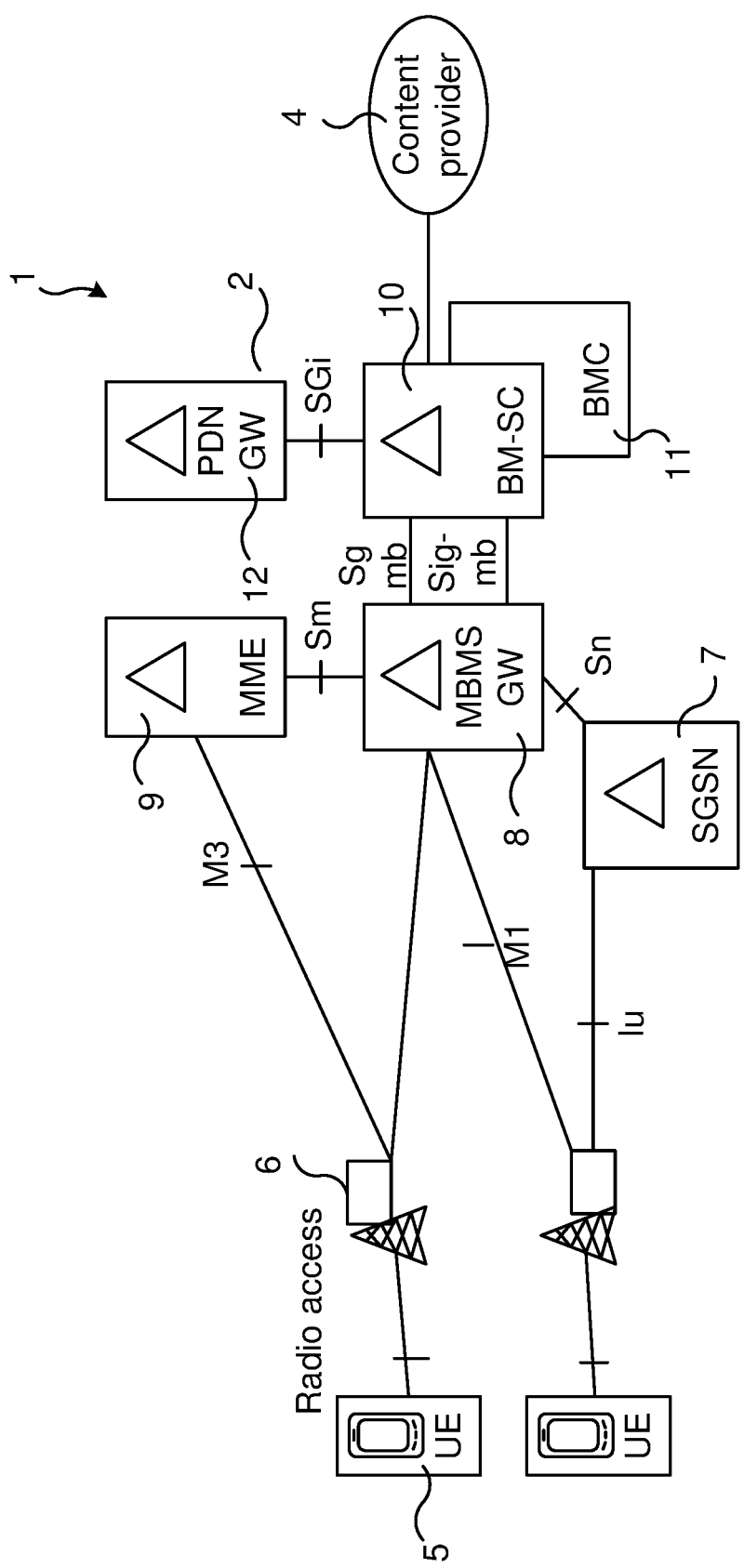
FIG. 1 illustrates schematically an environment in which embodiments of the present teachings may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

FIG. 1 illustrates schematically an environment in which embodiments of the present teachings may be implemented. A communication network 1 provides wireless communication to a number of end-users, and in particular to communication devices 5 of the end-users such as smartphones, laptops, mobile phones, tablets etc. The communication devices 5 are able to receive MBMS services, such as e.g. on-request services. The communication network 1 comprises at least one radio access node 6 that is capable of communicating wirelessly with the communication device 5 over an air interface, e.g. UTRAN or e-UTRAN. Such radio access node 6 may be denoted in different ways depending on the access technology at hand; for example in Long Term Evolution (LTE), the radio access node may be denoted evolved Node B (eNodeB or eNB), but are also often termed base station in LTE networks as well as in networks implementing other radio access technologies. The communication network 1 may comprise various nodes, some of which are briefly described in the following, mentioning in particular MBMS related functions thereof.

The role of a Serving General Packet Radio Service (GPRS) Support Node (SGSN) 7 in view of MBMS services is to perform MBMS bearer service control functions for individual communication devices and to provide MBMS transmissions to the radio access network, and in particular to the radio access nodes 6. The SGSN 7 is connected to the radio access nodes 6 through an interface.

The Multimedia Broadcast Multicast Service Gate Way (MBMS GW) 8 provides functionality for sending/broadcasting MBMS packets to each radio access node 6 transmitting the service. To this end, the MBMS uses Internet Protocol (IP) multicast, for forwarding MBMS user data to the radio access nodes 6. The MBMS GW 8 is also arranged to perform MBMS session control signaling (session start/stop) towards e.g. E-UTRAN via a Mobility Management Entity (MME) 9.

A Broadcast Multicast Service Center (BM-SC) 10 is a network node providing various MBMS specific functions, in particular for MBMS user service initiation and delivery. The BM-SC 10 is connected to the MBMS GW 8 and may for example be configured to perform security functions, session and transmission related tasks such as session scheduling, service announcements functions etc. In particular, the BM-SC 10 schedules an MBMS service, announces the service to the communication device 5, authorizes, allocates bearer service identification, and initiates and terminates MBMS bearer resources.

A Broadcast Management Center (BMC) 11, may but need not, be part of the BM-SC 10. The BMC 11 manages e.g. on-request services and broadcast events and may manage multiple BM-SCs 10. That is, various BM-SCs 10 may have a common management system, namely the BMC 11. The BMC 11 may for example generate service announcements common for the various BM-SCs. It is noted that the BMC 11 may be seen as part of the BM-SC 10, i.e. perform some of required functionality, or it may be a standalone node with an interface towards the BM-SC 10.

A Mobility Management Entity (MME) 9, connected to the MBMS GW 8, is involved in the signaling path to the radio access nodes 6, and the BM-SC 10 goes through the MME 9. The MME 9 provides session control of MBMS bearers to the E-UTRAN access, comprising e.g. reliable delivery of session start/session stop to E-UTRAN.

A Packet Data Network Gate Way (PDN GW) 12 connected to the BM-SC 10 is involved with functions such as file delivery, e.g. involved in file repair and reception reports.

The core network 2 may be connected to various third part service providers, such as a content delivery network (CDN) illustrated schematically at reference numeral 4 and in the following denoted content delivery node 4. Such CDN could of course alternatively be part of the communication network 1. An end-user wanting an on-request service from such content delivery node 4 connects to its communication network 1, in which the BM-SC 10 is responsible for communication with the content delivery node 4.

In order to provide a thorough understanding of the present disclosure, and for elaborating a bit more on the drawbacks with prior art, a known on-request session will be described with reference to FIG. 2. As mentioned in the background section, there are several sources of delay from a content provider to an end-user, and the inventor of the present disclosure has pinpointed one such delay and a way of overcoming it. In particular there is currently a long delay at file download from a content provider to the BM-SC, since the BM-SC has to cache the file in its local storage, perform file partitioning and Forward Error Correction (FEC) encoding. The file requested by the end-user will be delivered to the end user only once the FEC encoding is finished. As also mentioned in the background section, the operator needs to invest in an increasing number of various related hardware and software; as a particular example thereof the operator needs to invest in enough storage to be able to save e.g. cached content received from a content provider before further conveyance to the end-users. Further still, the operator of the cellular communication network needs to be involved in the content delivery operation, waiting for a notification event to trigger the content delivery. The present disclosure addresses, inter alia, these shortcomings of prior art.

Figure 2:
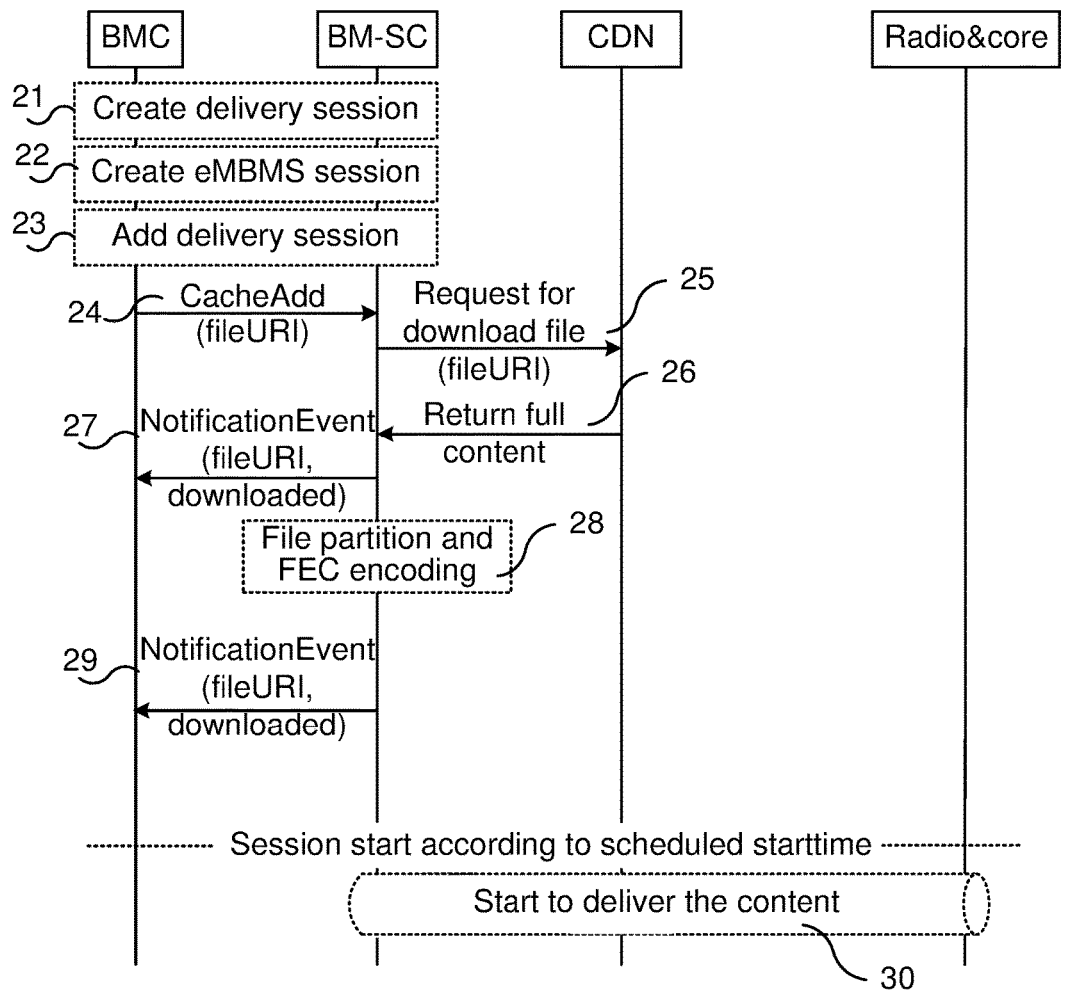
FIG. 2 is a sequence diagram illustrating a prior art on-request session.

FIG. 2 is thus a sequence diagram illustrating such prior art on-request session. There are some initial signaling between the BMC and the BM-SC when a on-request service is to be provided, for example creation of delivery session 21, creation of eMBMS session 22 and adding of deliver session 23. The BMC will invoke the BM-SC to download the original file from CDN and execute FEC encoding of the file to generate the encoding content (including both the original symbols and repair symbols) through a cacheAdd message 24. Next, the BM-SC requests 25, from the content provider, a file of an on-request service in turn requested by a user of a communication device. In response, the content provider receiving the request 25, returns 26 the full content of the file to the BM-SC. The BM-SC caches the file in its local storage and then sends a notification back to the BMC informing that the file download has been finished. Subsequently, the BM-SC starts partitioning the received file and performs the FEC encoding, as mentioned earlier. Once partitioned and FEC encoded, the encoded content should be cached in the BM-SC for later deliver. At the same time, the BM-SC sends a notification back to the BMC regarding the file being ready for delivery. When the MBMS session is initiated and the file delivery could be started, the BMC will to start 30 the delivery of the file content to the end-user according to a scheduled start time.

Figure 3:
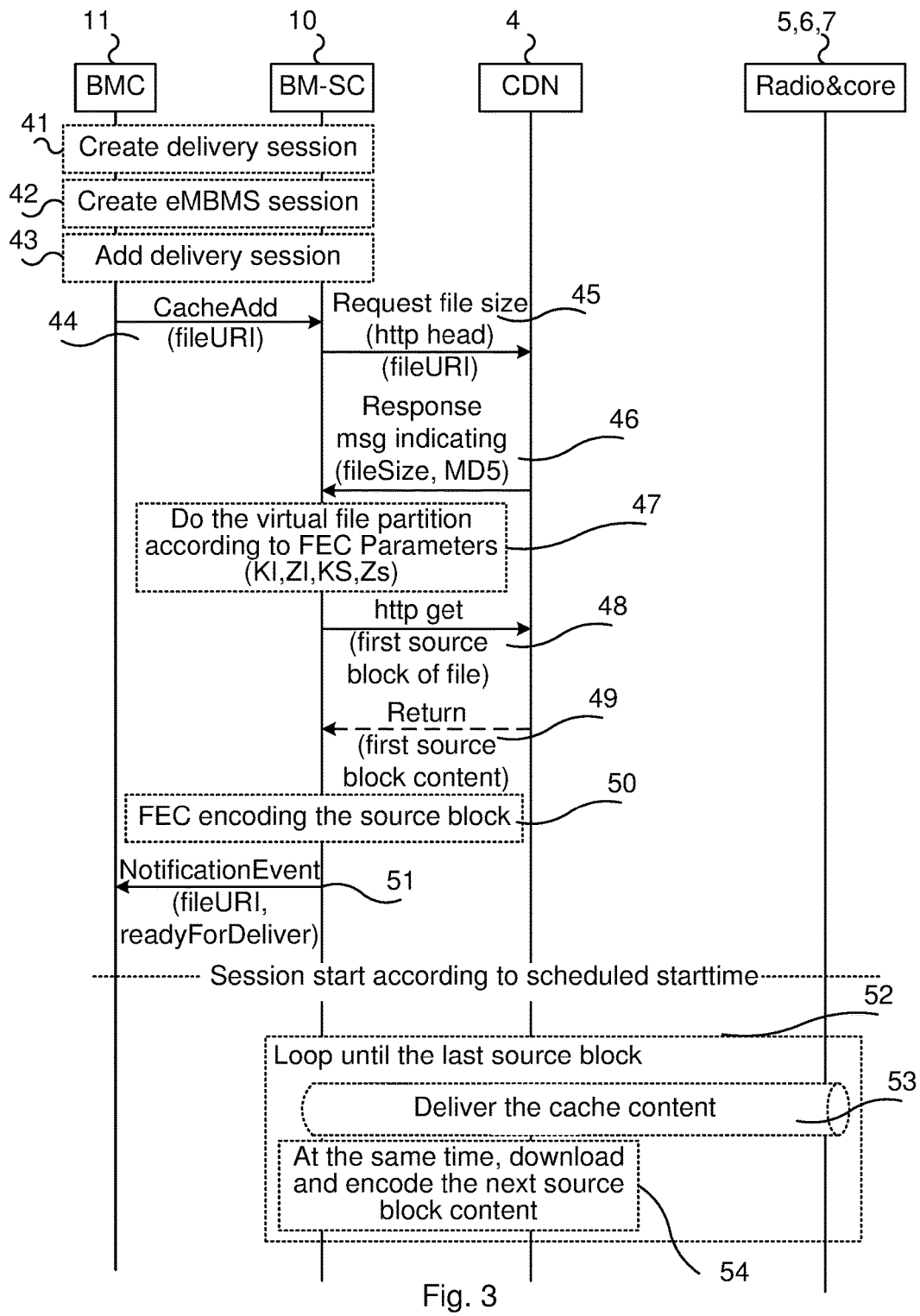
FIG. 3 is a sequence diagram illustrating an on-request session according to the present disclosure.

In contrast to the above, the present disclosure enables a faster delivery to the end-user and also alleviates the need of local storage in the BM-SC 10, which will be shown in the following. FIG. 3 is a sequence diagram illustrating an on-request session according to the present disclosure. A user of a communication device 5 within the communication network 1 wants to receive an on-request service. There are then, as for the prior art sequence diagram, first some initial signaling between the BMC 11 and the BM-SC 10 when a on-request service is to be provided, for example creation of delivery session 41, creation of eMBMS session 42 and adding of deliver session 43. The BMC 11 will, through the cacheAdd message, invoke the BM-SC 10 to cache a part of the file. The caching only a part of the file enables a smooth progressive broadcast delivery to be provided. This is in contrast to prior art, wherein the entire file is to be cached. Next, the BM-SC 10 requests 45, from the content delivery node 4, not the downloading of a file of the on-request service, but only the size thereof. In response, the content delivery node 4 that is receiving the request 45 returns at least the file size and also a checksum, if such is available. It is noted that still further data could be returned, if needed and if available. Based on the retrieved file size and possibly (and preferably) also the checksum, the BM-SC 10 may calculate FEC encoding parameters, such as source block size, number of source blocks and number of symbols per source block etc. (also refer to FIG. 5 and related text). The BM-SC 10 then performs 47 a virtual file partitioning based on the file size and the calculated FEC encoding parameters. This virtual file partitioning will be described more in detail later. The BM-SC 10 may then, e.g. in an http-get request, start to request 48 a first source block from the content delivery node 4. In response, the content delivery node 4 returns 49 a first (and possibly a few further) source block(s) having a size determined based on the file size and the FEC encoding parameters. When the BM-SC 10 receives the first source block it FEC encodes 50 it. A notification event message is sent 51 from the BM-SC 10 to the BMC 11, notifying the BMC 11 about a source block being ready for delivery. The BM-SC 10 also estimates the delivery time and generates a File Descriptor Table (FDT) for the file, by means of which the file can be received in the communication device 5. When the on-request service is to be started, the BM-SC will begin to deliver the first block, and at the same time it will download the next source block. Thus, at box 52, a loop is performed until the last source block of the file has been FEC encoded and delivered. In particular, content of the cache of the BM-SC 10 is delivered 53 to the end-user that requested the service and at the same time, the BM-SC 10 downloads 54 and FEC encodes the next source block content. This way of delivering the on-request makes it possible for e.g. a video-on-demand file to be played back in the receiving communication device 5 during broadcast delivery.

Figure 4:
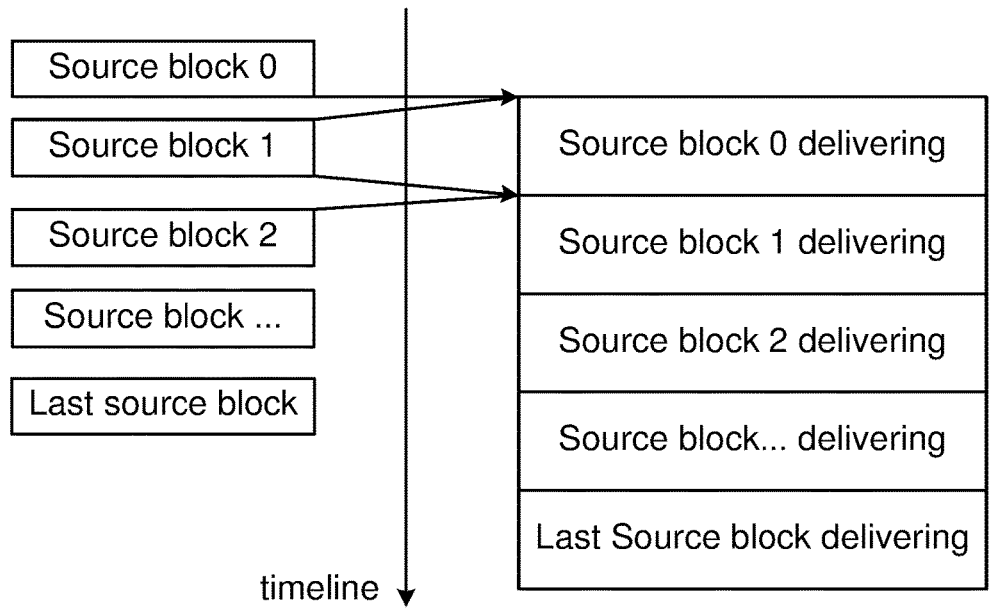
FIG. 4 illustrates downloading of parts of a file according to an aspect of the present disclosure.

FIG. 4 illustrates downloading of parts of a file according to an aspect of the present disclosure. The above described downloading and delivering are illustrated in the figure in a timeline overview. On the left side of the timeline, content of the cache memory of the BM-SC 10 is illustrated and on the right side of the timeline, delivering thereof is illustrated. Thus, a first source block 1 of the cache is provided for delivery, and while being delivered, the BM-SC 10 downloads a second source block, which is provided for delivery and so on. In order to save the cache memory used for the content cache, the BM-SC 10 may always keep at most e.g. one source block in cache waiting for delivery. During the delivery of the source block, the BM-SC 10 may download the next source block content, finish the FEC encoding and cache it in the cache queue. If the cache queue has any content, the BM-SC 10 may, in various embodiments, not download the next source block content until the cache queue is empty.

When the BM-SC receives the on-request content delivery command from the broadcast management center (BMC), it has to communicate with the CDN (or with the Multimedia Delivery Network (MDN), if implemented in such environment) to retrieve the file size and checksum. If implementing embodiments of the present disclosure in an MDN system (refer also to FIG. 9), the BM-SC will deliver the often requested (i.e. popular) content, available at a central server, to multiple edge servers. The checksum is obtained if possible, and is thus optional. According to the retrieved file size, BM-SC 10 may perform a virtual file partitioning according to FEC encoding parameters. Such FEC encoding parameters may comprise source block size, number of source blocks, the number of symbols per source blocks etc. Using the file size and FEC encoding parameters, the BM-SC 10 may estimate the delivery time and generate a File Descriptor Table (FDT) for this file. After that, the BM-SC 10 may start to deliver the file using the generated FDT.

BM-SC 10 FEC parameters could be defined locally in the BM-SC 10 or be set from the BMC it Examples of such FEC parameters comprise a symbol size T, and a file partitioning output, the number of symbols kl or ks (described below) in a source block, and also still further parameters such as FEC overhead. In the present disclosure, the FEC encoding can be executed per source block and not per file. For the virtual file partitioning, several parameters may be determined:

P, the maximum packet payload size, in bytes
Kmin, a minimum target on the number of symbols per source block Kmax, the maximum number of source symbols per source block Al, symbol alignment parameter, in bytes W, a target on the sub-block size, in bytes Gmax, a maximum target number of symbols per packet F, file size, obtained from the content delivery node 4, e.g. through an http head message.

All the above parameters are typically needed and may be calculated for the virtual file partitioning. Based thereon the BM-SC 10 may calculate Z (number of source blocks), T (symbol size), G (maximum number of symbols to be transported in a single packet), N (the number of sub-blocks in each source block) and Kl the total number of symbols required to represent the source data of the object etc.

A particular way of performing the virtual partitioning is given next. A function Partition[ ]takes a pair of integers (I, J) as input and derives four integers (IL, IS, JL, JS) as output. Specifically, the value of Partition[I, J] is a sequence of four integers (IL, IS, JL, JS), where IL=ceil(I/J), IS=floor(I/J), JL=I−IS*J, and JS=J−JL.

Thus, the virtual partitioning may be obtained by the function Partition[ ] and the earlier several parameters used in accordance with:

G=min{ceil(P*Kmin/F), P/Al, Gmax}, number of symbols per packet

T=floor(P/(Al*G))*Al

Kt=ceil(F/T)

Z=ceil(Kt/Kmax)

N=min{ceil(ceil(Kt/Z)*T/W), T/Al}

(KL, KS, ZL, ZS)=Partition[Kt, Z]

(TL, TS, NL, NS)=Partition[T/Al, N]

The result is that the file will be partitioned into Z=Zl+Zs contiguous source blocks, the first Zl source blocks each having length Kl*T bytes, and the remaining ZS source blocks each having Ks*T bytes. The BM-SC 10 should download each source block according to the size calculated by the above partition function.

The download of each source block may be based on the range header of the http get request, the range header value could be calculated according to the contiguous source blocks size.

The BM-SC 10 may download the first file source block as fast as possible, and when it has finished the downloading, BM-SC 10 may start to do the FEC encoding and put the encoded encoding symbol to a cache queue. The BM-SC 10 may comprise a delivery function which could deliver the encoded encoding symbols immediately. While delivering the encoding symbols, the BM-SC 10 may download the next source block and do FEC encoding if it finds the cache queue to be empty. The BM-SC 10 should not download the next source block before this cache queue is empty, since this enables the cached content to not be using too much memory. At the same time, it is ensured that there is enough content to be delivered when the previous source has been delivered. The BM-SC 10 delivers the source blocks one by one until the last source block.

Figure 5:
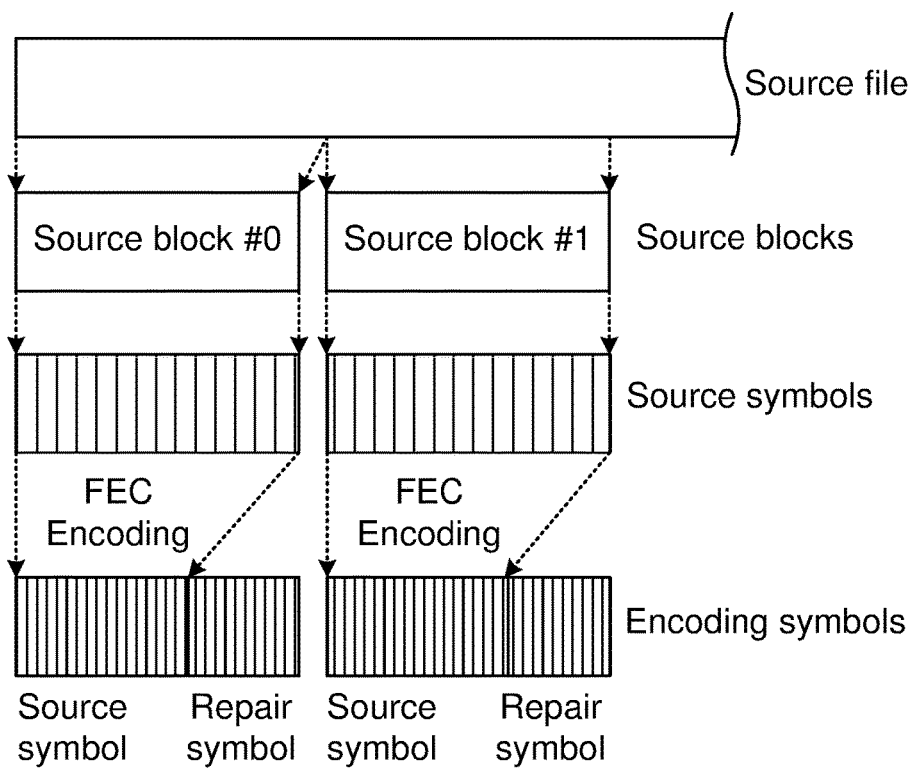
FIG. 5 illustrates schematically partitioning of a file and encoding.

FIG. 5 illustrates schematically partitioning of a file. A file of the on-request service is illustrated as source file in the figure. When the BM-SC 10 is about to download the source file from the content delivery node 4, it downloads a source block at a time. That is, the source file is partitioned into a number of source blocks, e.g. as described earlier. The source blocks each comprises a number of source symbols, which are FEC encoded into encoding symbols. Each encoding symbol comprises encoded source symbols and also repair symbols. The repair symbols are provided for enabling the FEC decoder to recover the original content if some source symbols have been lost in the communication network.

Figure 6:
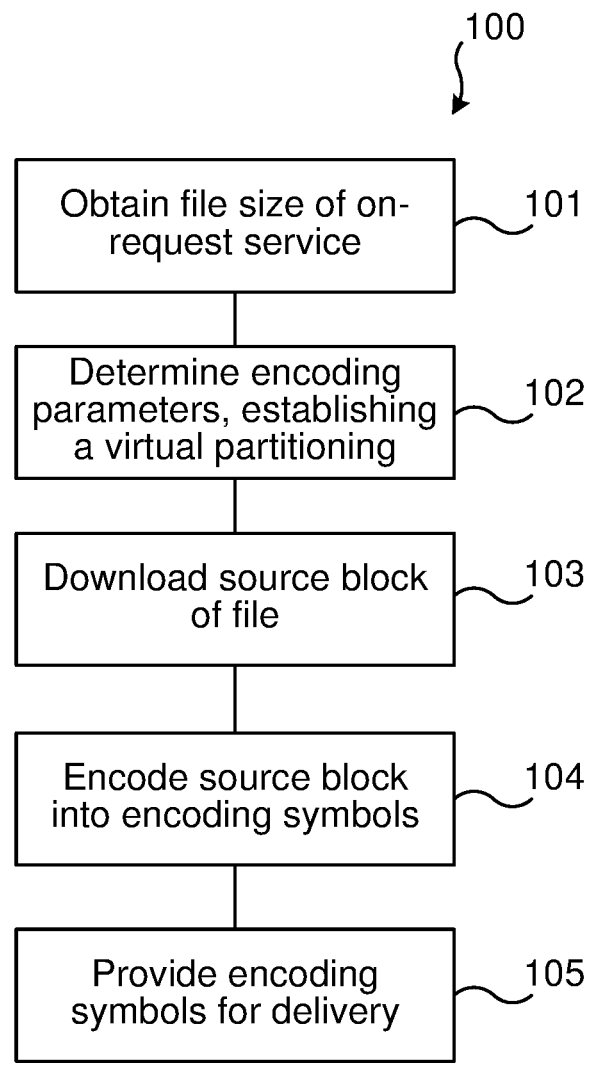
FIG. 6 illustrates a flow chart over steps of a method in a network node in accordance with an aspect of the present disclosure.

FIG. 6 illustrates a flow chart over steps of a method in a network node in accordance with an aspect of the present disclosure. The method 100 is performed in a broadcast multicast service center, BM-SC, node 10 for providing an on-request service to an end-user device 5.

The method 100 comprises obtaining 101, from a content delivery node 4, the size of a file of the on-request service. The file size may be expressed as number of bytes.

The method 100 comprises determining 102, based on the obtained file size, one or more parameters related to encoding of the file, thereby establishing a virtual partitioning of the file into a number Z of source blocks.

The method 100 comprises downloading 103, from the content delivery node 4, a source block of the file according to the determined one or more parameters. The downloading 103 may comprise requesting such source block and receiving it. The parameters may in particular comprise file partitioning output parameters.

The method 100 comprises encoding 104 the source block of the file into encoding symbols according to the determined one or more parameters. The BM-SC 10 may perform the downloading 103 as fast as possible and then, once finished downloading, start the encoding, e.g. FEC encoding, and subsequently put the FEC encoded encoding symbols in a cache queue. From the cache queue, the BM-SC 10 may deliver the encoding symbols immediately.

The method 100 comprises providing 105 the encoding symbols for delivery to the end-user device 5.

In an embodiment, the obtaining 101 further comprises obtaining a checksum, and wherein the providing 105 is further based on the checksum. The checksum value for the file may be used by the end-user device 5 in order to check that the received content corresponds to the content delivered from the BM-SC 10. That is, the checksum value may be used for identifying the delivered content version, as different versions have different check-sums.

In an embodiment, the method 100 comprises performing the encoding 104 of the source block of the file while downloading 103 a subsequent source block of the file.

In an embodiment, the determining 102 one or more parameters related to encoding of the source blocks comprises determining forward error correction encoding parameters comprising at least the source block size, the number Z of source blocks, and number of symbols per source block. It is noted that still other FEC encoding parameters may be used, e.g. alignment, symbol size, sub-symbol size, maximum number of symbols per block etc.

In an embodiment, the determining 102 comprises calculating the virtual partitioning into Z contiguous source blocks, wherein a first number ZL of source blocks each have a length of KL*T bytes, and a second number ZS of source blocks comprising the remaining source blocks each have a length of KS*T bytes, wherein T is a symbol size, K is the number of symbols of the file, KL is the ceiling function of K/Z, and KS is the floor function of K/Z.

In an embodiment, the method 100 comprises repeating the downloading 103, encoding 104 and providing 105 until the file has been provided for delivery to the end-user device 5.

In an embodiment, the method 100 comprises determining that a cache queue comprising an encoded source block is empty before downloading 103 a subsequent source block. By determining that the cache queue is empty before downloading a next source block, it is ensured that the cached content is not using too much memory, while it is still ensured that there is enough content to be delivered when the previous downloading has been finished.

In an embodiment, the providing 105 comprises estimating a delivery time for the file, and generating a file descriptor table for the file.

In an embodiment, the downloading 103 comprises using a range header of a Hypertext Transfer Protocol, http, get request, and wherein the range header value is calculated based on the sequential source block sizes.

In an embodiment, the one or more parameters related to encoding comprise one or more of: a maximum packet payload size, a minimum number Kmin of symbols per source block, a maximum number Kmax of symbols per source block, a symbol alignment parameter, a target size W of sub-block of the source block, a maximum target number Gmax of symbols per packet, a number N of sub-blocks in each source block, the total number K of symbols required to represent data of the file of the on-request service.

In an embodiment, the providing 105 comprises providing the encoding symbols and/or source symbols from the source block to a core network node 7 for further conveyance to a radio access node 6 providing wireless communication to the end-user device 5.

Figure 7:
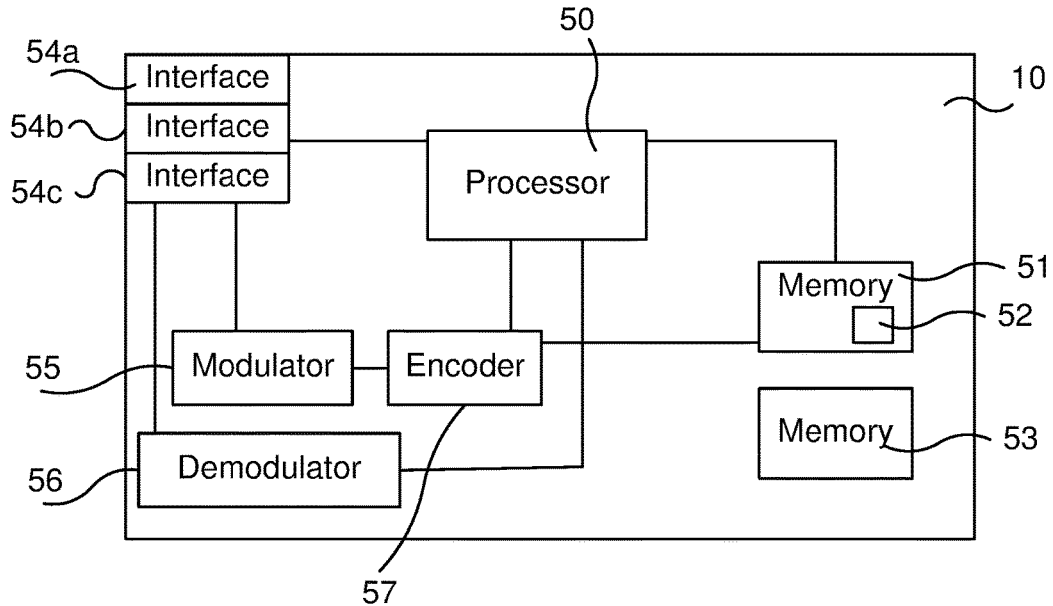
FIG. 7 illustrates schematically a network node and means for implementing embodiments of the method of the present disclosure.

FIG. 7 illustrates schematically a BM-SC node 10 and means for implementing embodiments of the method of the present disclosure. The BM-SC node 10 comprises a processor 50 comprising any combination of one or more of a central processing unit (CPU), multiprocessor, microcontroller, digital signal processor (DSP), application specific integrated circuit etc. capable of executing software instructions stored in a memory 51, which can thus be a computer program product 51.

A data memory 53 may also be provided for reading and/or storing data during execution of software instructions in the processor 50. The data memory 53 can be any combination of read and write memory (RAM) and read only memory (ROM). In particular the data memory 53 may be a cache in which the BM-SC 10 keeps a source block in a cache queue waiting for delivery.

The BM-SC 10 further comprises one or more interfaces 54a, 54b, 54c for communicating with various nodes and entities in the core network 2 and also with entities external to the communication network 1, such as e.g. the content delivery node 4. For example, the BM-SC 10 may comprise a first interface 54a, e.g. a protocol, for communicating with the MBMS GW 8, which first interface 54a is then able to communicate over SGmb interface and/or SGI-mb interface. The BM-SC 10 may comprise a second interface 54b, e.g. a protocol, for communicating with the BMC 11. The BM-SC 10 may comprise a third interface 54c, e.g. a protocol, for communicating with the PDN GW 12. The BM-SC 10 may have further, or fewer, such interfaces.

The BM-SC 10 may further comprise conventional devices for performing various tasks. The BM-SC 10 may for instance comprise an encoder 57 for encoding e.g. the source blocks to encoding symbols, and a modulator 55 for enabling the providing of the encoding symbols to one or more receiving part(s) via an interface 54a, 54b, 54c. Correspondingly, the BM-SC 10 may comprise a demodulator 56 for receiving e.g. from the content delivery node 4 (via an interface 54a, 54b, 54c) the source blocks.

The processor 50 can be configured to execute any of the various embodiments of the method as described, e.g. as described in relation to FIG. 6.

In particular, a BM-SC node 10 provided for providing an on-demand service to an end-user device 5. The BM-SC node 10 comprises a processor 50 and memory 51, the memory 51 containing instructions executable by the processor 50, whereby the BM-SC node 10 is operative to:

obtain, from a content delivery node 4, the size of a file of the on-request service;

determine, based on the obtained file size, one or more parameters related to encoding of the file, thereby establishing a virtual partitioning of the file into a number Z of source blocks;

download, from the content delivery node 4, a source block of the file according to the determined one or more parameters;

encode the source block of the file into encoding symbols according to the determined one or more parameters; and provide the encoding symbols for delivery to the end-user device 5.

In an embodiment, the BM-SC, node 10 is operative to obtain by further obtaining a checksum, and wherein the BM-SC, node 10 is operative to provide further based on the checksum.

In an embodiment, the BM-SC, node 10 is operative to perform the encoding of the source block of the file while downloading a subsequent source block of the file.

In an embodiment, the BM-SC, node 10 is operative to determine one or more parameters related to encoding of the source blocks by determining forward error correction encoding parameters comprising at least the source block size, the number Z of source blocks, and number of symbols per source block.

In an embodiment, the BM-SC, node 10 is operative to determine by calculating the virtual partitioning into Z contiguous source blocks, wherein a first number ZL of source blocks each have a length of KL*T bytes, and a second number ZS of source blocks comprising the remaining source blocks each have a length of KS*T bytes, wherein T is a symbol size, K is the number of symbols of the file, KL is the ceiling function of K/Z, and KS is the floor function of K/Z.

In an embodiment, the BM-SC, node 10 is operative to repeat the downloading, encoding and providing until the file has been provided for delivery to the end-user device 5.

In an embodiment, the BM-SC, node 10 is operative to determine that a cache queue comprising an encoded source block is empty before downloading a subsequent source block.

In an embodiment, the BM-SC, node 10 is operative to provide by estimating a delivery time for the file, and generating a file descriptor table for the file.

In an embodiment, the BM-SC, node 10 is operative to download by using a range header of a Hypertext Transfer Protocol, http, get request, and wherein the range header value is calculated based on the sequential source block sizes.

In an embodiment, the one or more parameters related to encoding comprise one or more of: a maximum packet payload size, a minimum number Kmin of symbols per source block, a maximum number Kmax of symbols per source block, a symbol alignment parameter, a target size W of sub-block of the source block, a maximum target number Gmax of symbols per packet, a number N of sub-blocks in each source block, the total number K of symbols required to represent data of the file of the on-request service.

In an embodiment, the BM-SC, node 10 is operative to provide by providing the encoding symbols and/or source symbols from the source block to a core network node 7 for further conveyance to a radio access node 6 providing wireless communication to the end-user device 5.

The present disclosure also encompasses a computer program product 51 comprising a computer program 52 for implementing the embodiments of the method as has been described, and a computer readable means on which the computer program 52 is stored. The computer program product 51 may be any combination of read and write memory (RAM) or read only memory (ROM). The computer program product 51 may also comprise persistent storage, which for example can be any single one or combination of magnetic memory, optical memory or solid state memory.

The present disclosure thus comprises a computer program 52 for a broadcast multicast service center, BM-SC, node 10 for providing an on-demand service to an end-user device 5. The computer program 52 comprises computer program code, which, when run on the BM-SC node 10 causes the BM-SC node 10 to: obtain, from a content delivery node 4, the size of a file of the on-request service; determine, based on the obtained file size, one or more parameters related to encoding of the file, thereby establishing a virtual partitioning of the file into a number Z of source blocks; download, from the content delivery node 4, a source block of the file according to the determined one or more parameters; encode the source block of the file into encoding symbols according to the determined one or more parameters; and provide the encoding symbols for delivery to the end-user device 5.

The computer program product, or the memory, comprises instructions executable by the processor 50. Such instructions may be comprised in a computer program, or in one or more software modules or function modules.

Figure 8:
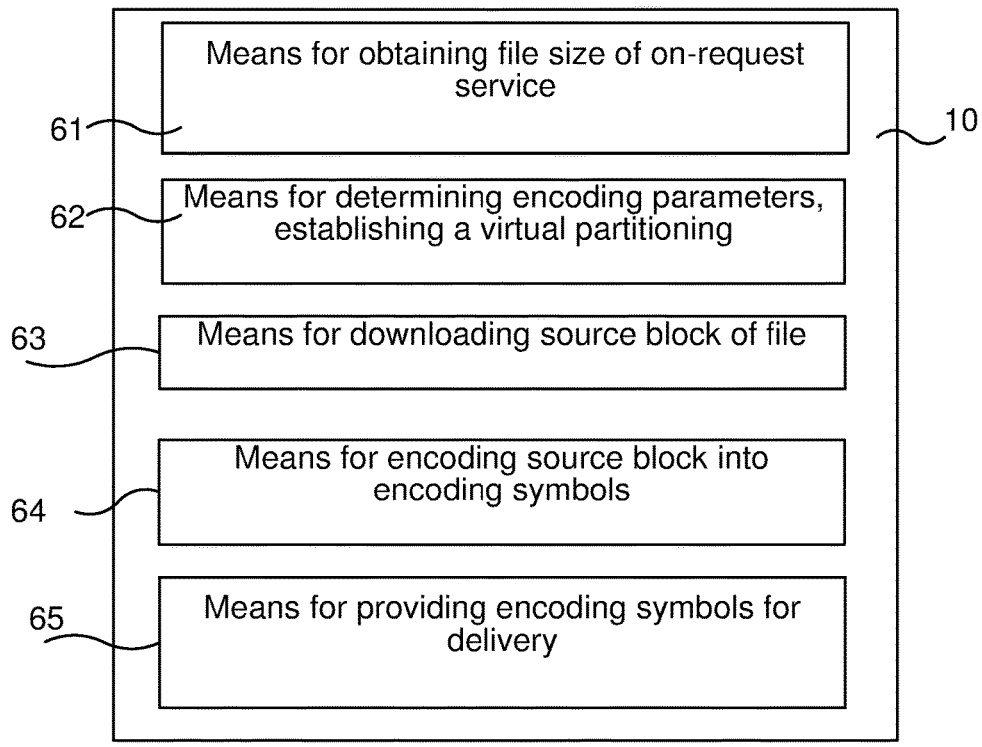
FIG. 8 illustrates a network node comprising function modules/software modules for implementing embodiments of the method of the present disclosure.

An example of an implementation using functions modules/software modules is illustrated in FIG. 8, in particular illustrating a BM-SC node 10 comprising function modules for implementing the various embodiments of the method of the present disclosure. The BM-SC node 10 for providing an on-demand service to an end-user device 5 comprises first means 61, for example a first function module, for obtaining, from a content delivery node 4, the size of a file of the on-request service. The BM-SC node 10 comprises second means 62, for example a second function module 62, for determining, based on the obtained file size, one or more parameters related to encoding of the file, thereby establishing a virtual partitioning of the file into a number Z of source blocks. The BM-SC node 10 comprises third means 63, for example a third function module 63, for downloading, from the content delivery node 4, a source block of the file according to the determined one or more parameters. The BM-SC node 10 comprises fourth means 64, for example a fourth function module 64, for encoding the source block of the file into encoding symbols according to the determined one or more parameters. The BM-SC node 10 comprises fifth means 65, for example a fifth function module 65, for providing the encoding symbols for delivery to the end-user device 5.

The first, second, third, fourth and fifth means 61, 62, 63, 64, 65 can be implemented using software instructions such as computer program executing in a processor and/or using hardware, such as application specific integrated circuits, field programmable gate arrays, discrete logical components etc.

It is noted that the BM-SC node 10 may comprise yet additional means, not illustrated, for performing further features of the various embodiments of the method.

Figure 9:
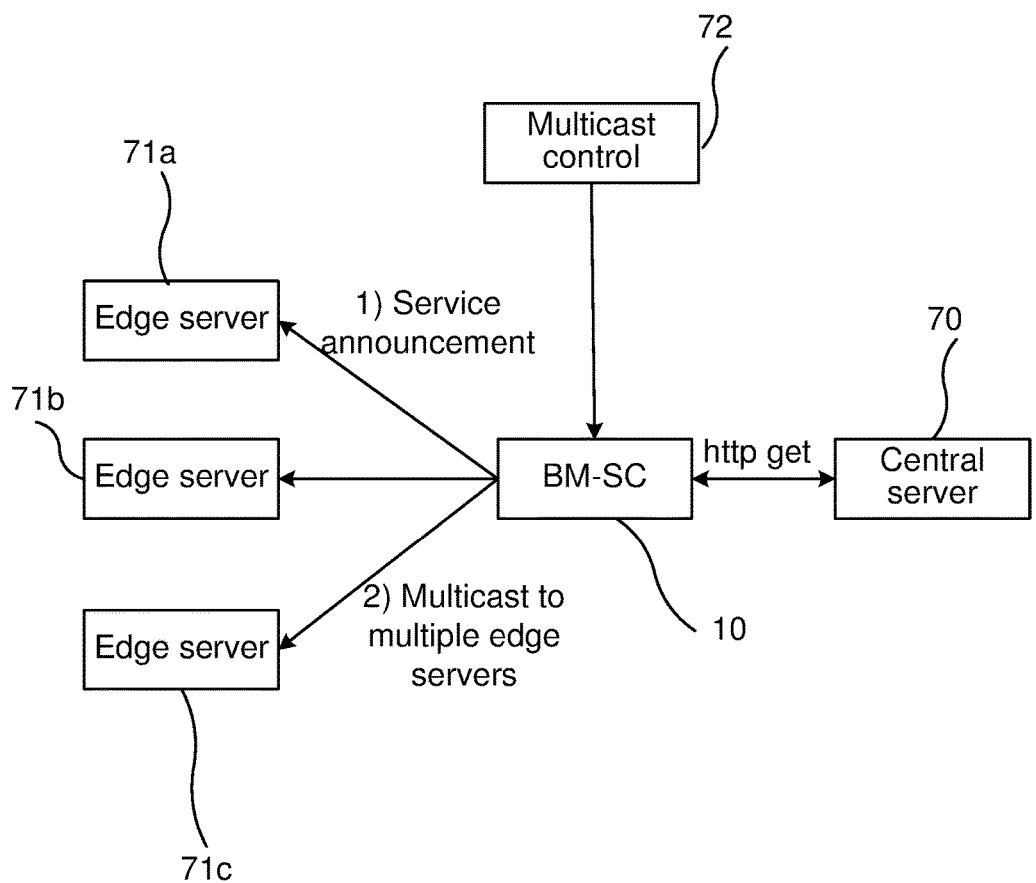
FIG. 9 illustrates schematically another environment in which embodiments of the present teachings may be implemented.

FIG. 9 illustrates schematically another environment in which embodiments of the present teachings may be implemented. Embodiments of the present disclosure may be used in a MDN environment to distribute content from a central server 70 to one or more, typically multiple, edge servers via, 71b, 71c as well. In such MDN environment, there is one central server 70 caching all the content, and the edge servers 71a, 71b, 71c may have high hit rates contents, i.e. the edge servers 71a, 71b, 71c may have popular content that is often requested by the end-user devices. In the conventional solution, the edge server uses a unicast request to fetch the content from the central server, and if there are many edge servers, the unicasting could be a bottleneck causing delay. However, if using the eMBMS solution of the present disclosure, there is only need for using one multicast channel to distribute the content to all the edge servers via, 71b, 71c. It is thus not required that the BM-SC 10 caches the content from the central server 70. The BM-SC 10 downloads from the central server 70 a source block at a time as have been described, and uses the described file delivery method to distribute the contents to the edge servers.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a broadcast multicast service center (BM-SC) node for providing an on-request service to an end-user device, the method comprising:
    obtaining, from a content delivery node, the size of a file of the on-request service;
    determining, based on the obtained file size, one or more parameters related to encoding of the file, thereby establishing a virtual partitioning of the file into a number Z of source blocks;
    downloading, from the content delivery node, a source block of the file according to the determined one or more parameters;
    encoding the source block of the file into encoding symbols according to the determined one or more parameters; and
    providing the encoding symbols for delivery to the end-user device.

2. The method of claim 1, wherein the obtaining further comprises obtaining a checksum, and wherein the providing is further based on the checksum.

3. The method of claim 1, comprising performing the encoding of the source block of the file while downloading a subsequent source block of the file.

4. The method of claim 1, wherein the determining one or more parameters related to encoding of the source blocks comprises determining forward error correction encoding parameters comprising at least the source block size, the number Z of source blocks, and number of symbols per source block.

5. The method of claim 1, wherein the determining comprises calculating the virtual partitioning into Z contiguous source blocks, wherein a first number $Z_L$ of source blocks each have a length of $K_L*T$ bytes, and a second number $Z_S$ of source blocks comprising the remaining source blocks each have a length of $K_S*T$ bytes, wherein T is a symbol size, K is the number of symbols of the file, $K_L$ is the ceiling function of K/Z, and $K_S$ is the floor function of K/Z.

6. The method of claim 1, comprising repeating the downloading, encoding and providing until the file has been provided for delivery to the end-user device.

7. The method of claim 1, comprising determining that a cache queue comprising an encoded source block is empty before downloading a subsequent source block.

8. The method of claim 1, wherein the providing comprises estimating a delivery time for the file, and generating a file descriptor table for the file.

9. The method of claim 1, wherein the downloading comprises using a range header of a Hypertext Transfer Protocol (http) get request, and wherein the range header value is calculated based on the sequential source block sizes.

10. The method of claim 1, wherein the one or more parameters related to encoding comprise one or more of: a maximum packet payload size, a minimum number Kmin of symbols per source block, a maximum number Kmax of symbols per source block, a symbol alignment parameter, a target size W of sub-block of the source block, a maximum target number Gmax of symbols per packet, a number N of sub-blocks in each source block, and the total number K of symbols required to represent data of the file of the on-request service.

11. A broadcast multicast service center (BM-SC) node for providing an on-demand service to an end-user device, the BM-SC node comprising a processor and memory, the memory containing instructions executable by the processor, whereby the BM-SC node is operative to:
obtain, from a content delivery node, the size of a file of the on-request service,
determine, based on the obtained file size, one or more parameters related to encoding of the file, thereby establishing a virtual partitioning of the file into a number Z of source blocks,
download, from the content delivery node, a source block of the file according to the determined one or more parameters,
encode the source block of the file into encoding symbols according to the determined one or more parameters, and
provide the encoding symbols for delivery to the end-user device.

12. The broadcast multicast service center (BM-SC) node of claim 11, wherein the BM-SC node is operative to obtain by further obtaining a checksum, and wherein the BM-SC node is operative to provide further based on the checksum.

13. The broadcast multicast service center (BM-SC) node of claim 11, wherein the BM-SC node is operative to perform the encoding of the source block of the file while downloading a subsequent source block of the file.

14. The broadcast multicast service center (BM-SC) node of claim 11, wherein the BM-SC node is operative to determine one or more parameters related to encoding of the source blocks by determining forward error correction encoding parameters comprising at least the source block size, the number Z of source blocks, and number of symbols per source block.

15. The broadcast multicast service center (BM-SC) node of claim 11, wherein the BM-SC node is operative to determine by calculating the virtual partitioning into Z contiguous source blocks, wherein a first number $Z_L$ of source blocks each have a length of $K_L*T$ bytes, and a second number $Z_S$ of source blocks comprising the remaining source blocks each have a length of $K_S*T$ bytes, wherein T is a symbol size, K is the number of symbols of the file, $K_L$ is the ceiling function of K/Z, and $K_S$ is the floor function of K/Z.

16. The broadcast multicast service center (BM-SC) node of claim 11, wherein the BM-SC node is operative to repeat the downloading, encoding and providing until the file has been provided for delivery to the end-user device.

17. The broadcast multicast service center (BM-SC) node of claim 11, wherein the BM-SC node is operative to determine that a cache queue comprising an encoded source block is empty before downloading a subsequent source block.

18. The broadcast multicast service center (BM-SC) node of claim 11, wherein the BM-SC node is operative to provide by estimating a delivery time for the file, and generating a file descriptor table for the file.

19. The broadcast multicast service center (BM-SC) node of claim 11, wherein the BM-SC node is operative to download by using a range header of a Hypertext Transfer Protocol (http) get request, and wherein the range header value is calculated based on the sequential source block sizes.

20. A non-transitory computer-readable medium comprising, stored thereupon, a computer program for a broadcast multicast service center (BM-SC) node for providing an on-demand service to an end-user device, the computer program comprising computer program code that, when run on the BM-SC node, causes the BM-SC node to:
obtain, from a content delivery node, the size of a file of the on-request service,
determine, based on the obtained file size, one or more parameters related to encoding of the file, thereby establishing a virtual partitioning of the file into a number Z of source blocks,
download, from the content delivery node, a source block of the file according to the determined one or more parameters,
encode the source block of the file into encoding symbols according to the determined one or more parameters, and
provide the encoding symbols for delivery to the end-user device.

\* \* \* \* \*